Dec. 2, 1969  G. F. ABBOTT ETAL  3,482,057
AUTOMATIC INTERCEPT SYSTEM
Filed Jan. 28, 1966  9 Sheets-Sheet 1

INVENTORS
GEORGE F. ABBOTT
JOSEPH A. CEONZO
JOHN F. ISENBERG JR.
ROBERT A. JOHNSON
JOHN M. REGAN

BY Earl C. Hancock
ATTORNEY

Dec. 2, 1969  G. F. ABBOTT ET AL  3,482,057
AUTOMATIC INTERCEPT SYSTEM
Filed Jan. 28, 1966  9 Sheets-Sheet 6

Dec. 2, 1969  G. F. ABBOTT ET AL  3,482,057
AUTOMATIC INTERCEPT SYSTEM
Filed Jan. 28, 1966  9 Sheets-Sheet 9

United States Patent Office 3,482,057
Patented Dec. 2, 1969

3,482,057
AUTOMATIC INTERCEPT SYSTEM
George F. Abbott, Raleigh, N.C., and Joseph A. Ceonzo, Poughkeepsie, and John F. Isenberg, Jr., Woodstock, N.Y., Robert A. Johnson, Raleigh, N.C., and John M. Regan, Rhinebeck, N.Y., assignors to International Business Machines Corporation, Armonk, N.Y., a corporation of New York
Filed Jan. 28, 1966, Ser. No. 523,612
Int. Cl. H04m 3/60
U.S. Cl. 179—27                                         10 Claims

ABSTRACT OF THE DISCLOSURE

Apparatus is disclosed which will compose an audio message in response to signals representing a non-operative called number, the signals being keyed by an operator or derived automatically.

---

This invention relates to arrangements for receiving signals from a plurality of channels and for automatically composing an audio reply to the received signals in accordance with the type of signal received. More particularly, the present invention relates to telephone systems wherein intercepted calls are answered by an audio response which has been automatically composed on the basis of information relative to the connection which was attempted.

Telephone calls attempted but which cannot be completed for any reason are connected to special trunks and are said to be intercepted. For commercial telephone systems, the calling party must be informed as to why the connection could not be completed. For instance, intercept would be required whenever a call was attempted to a number that did not exist, a number that had been removed from service, unassigned numbers, numbers that are temporarily out of operation and the like.

In the past, telephone calls which are attempted but which could not be connected for any reason were handled either by a standard recording which played a fixed message to the intercept connection or by an operator who received the intercepted call, attempted to ascertain what had caused the connection failure, and informed the subscribed of the results. The operator was connected even to the intercepted call that was initially referred to the recording if the subscribed failed to go on hook after the recording was completed. The operators were located at central offices and had to be provided with updated information on a regular basis in order to perform their function. So-called intercept directories had to be printed and distributed on as a rapid and accurate a basis as possible. Thus rapid updating of the available operation was a chronic problem as was the economy of providing such a function.

The present invention provides a system for composing machine generated audio responses to intercepted telephone connections on the basis of the identification of the number which the subscriber attempted to call. This system requires a minimum of human intervention and is capable of rapid updating of the stored information. Further, the system is flexible and economical to operate. The invention permits the handling of all intercept functions at a central location and, with relatively insignficant exceptions, does not require the printing or distributing of intercept directories or the like. Continuous monitoring and recording of the number of attempts to call a number that has been removed from service can be automatically performed by this system so as to optimize the time for re-assignment of this number. That is, a number re-assigned too soon results in annoyance to the new subscriber by parties attempting to call the former subscriber whereas withholding of the number for an excessive period represents potentially lost revenues.

The present invention by recording call attempts makes it possible to accurately and quickly determine the minimum waiting time for re-assignment of each and every number that has been removed from service.

The present invention is capable of handling different types of intercept trunk appearances each including a request for service and, by use of an arrangement for permitting operator intervention or by automatic means, provides identification signals representative of the number which was called and which resulted in the service request. The system includes in association therewith a means for storing information concerning all of the numbers for which service requests are anticipated. Also included is apparatus which is responsive to the signal that identifies the called number for composing an audio response to be returned to the subscriber who originated the intercepted connection with this response being in accordance with the information contained in the storing means relative to the intercepted number. As a practical matter, it is obvious that no data storage and processing arrangement could contain information capable of handling all possible intercept signals. Therefore, for practical applications, the present system can include an arrangement for connecting the subscriber to a special intercept operator for processing of the small percentage of calls that cannot be handled by the machine. Although the description of the preferred embodiment as set forth hereinafter includes a human operator intervention means for providing called number indentification, it is contemplated that this function can easily be automated in the present invention whenever telephone systems signalling so permits.

Accordingly, it is a primary object of this invention to provide an automatic intercept call handling system.

It is a further object of this invention to provide a call intercept handling system which can compose an audio response related to the called number.

Another object of this invention is to provide telephone call intercept handling including automatic composing and transmitting of an audio response to the subscriber.

Yet another object of the invention is to provide a system for switching intercepted calls along with a signal identifying the called number into a data storage and processing system and for returning to the subscriber an audio signal related to the number called.

Still another object is to provide means for centrally handling intercepted telephone calls on an automatic basis.

Yet another object of this invention is to provide a system for handling automatically intercepted calls so as to provide rapid updating of stored intercept information.

Another object of the invention is to provide the automatic telephone call intercept handling system capable of including central means for compiling data on attempts to complete a call to a particular number.

The foregoing and other objects, features and advantages of the present invention will be apparent from the following more particular description of a preferred embodiment of the invention as is illustrated in the accompanying drawings in which:

FIGURE 1 is a generalized block diagram of an intercept system in accordance with the present invention;

FIGURE 2 presents a block diagram of a preferred embodiment of the present invention;

Figure 7:
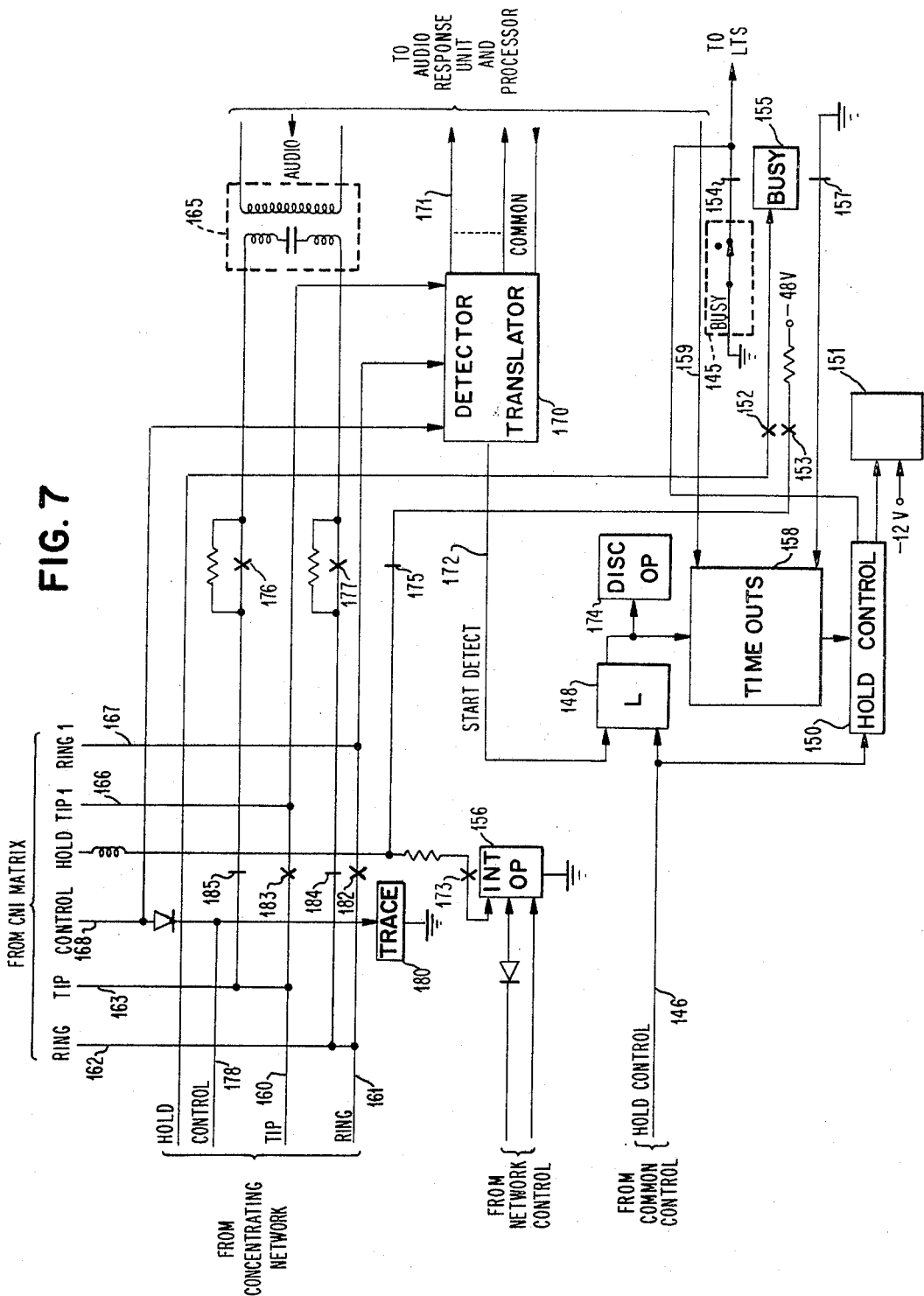
Figure 8:
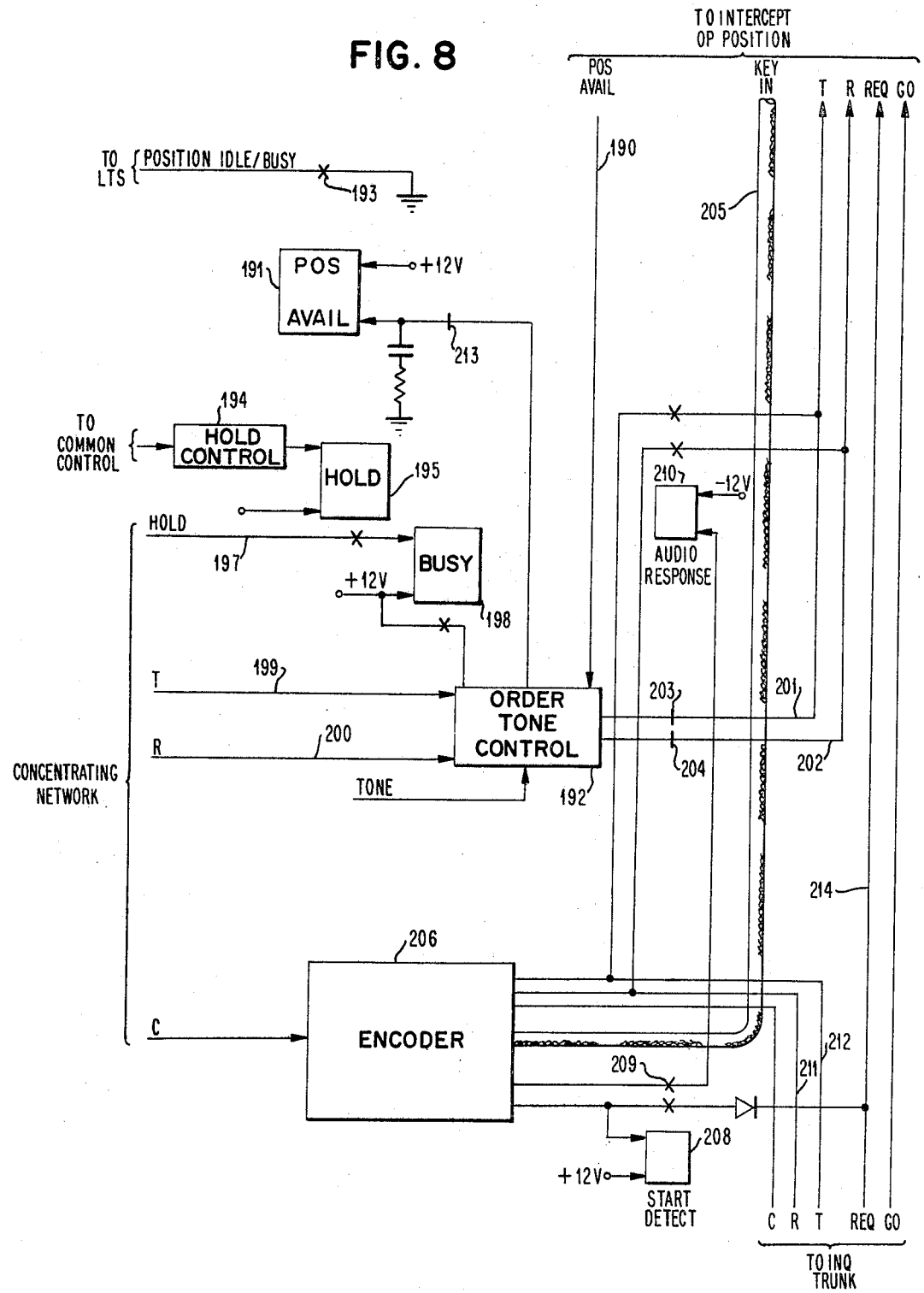
Figure 9:
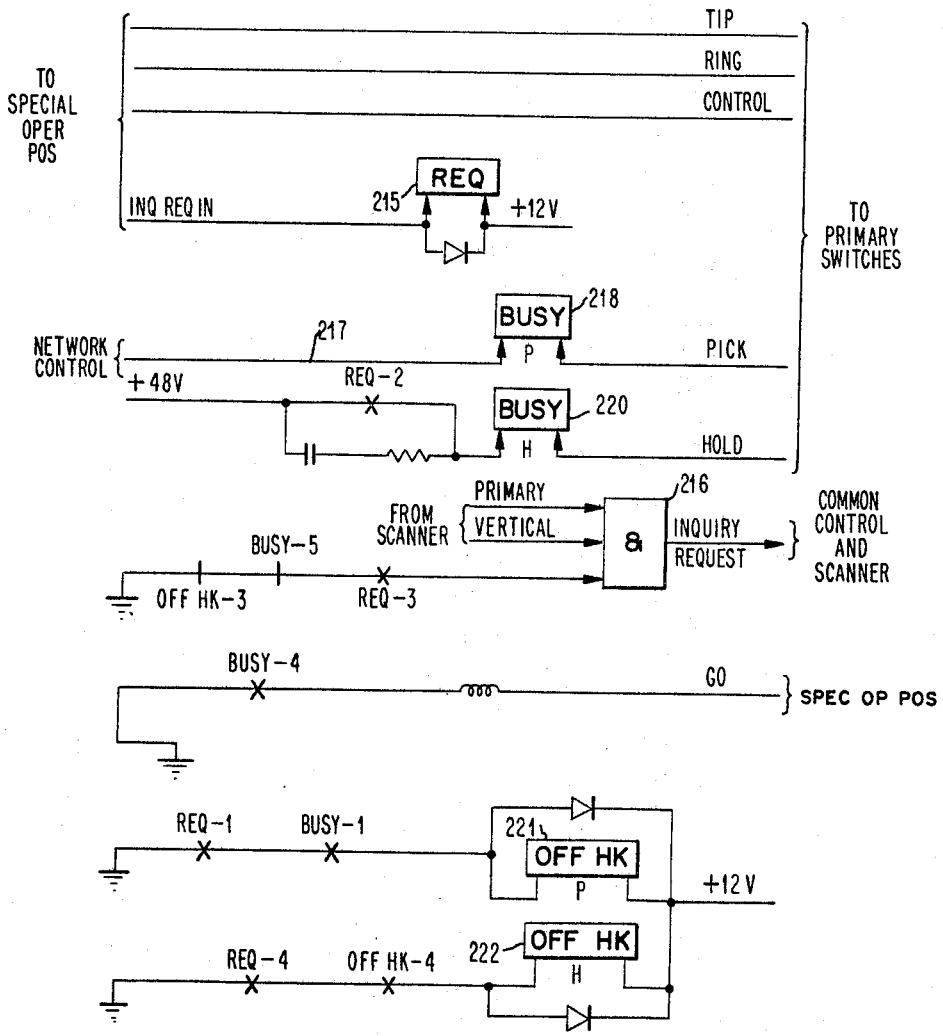
Figure 10:
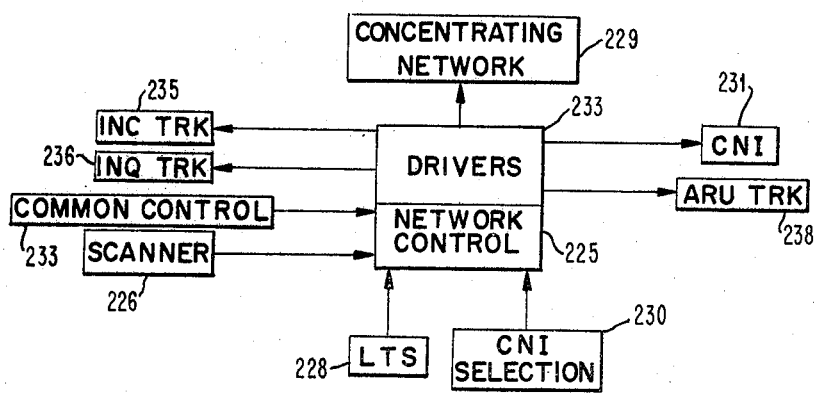
Figure 11:
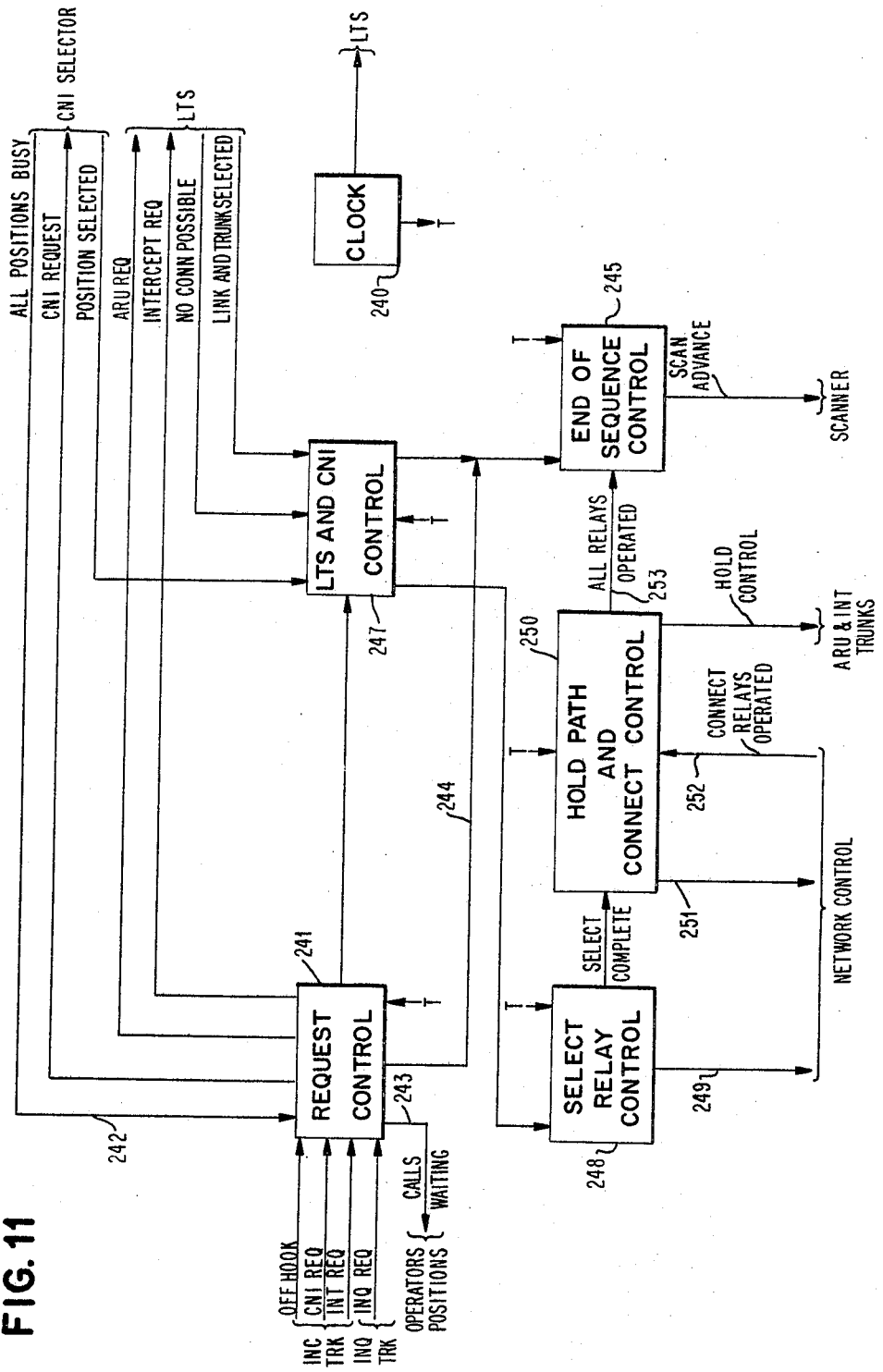
Figure 12:
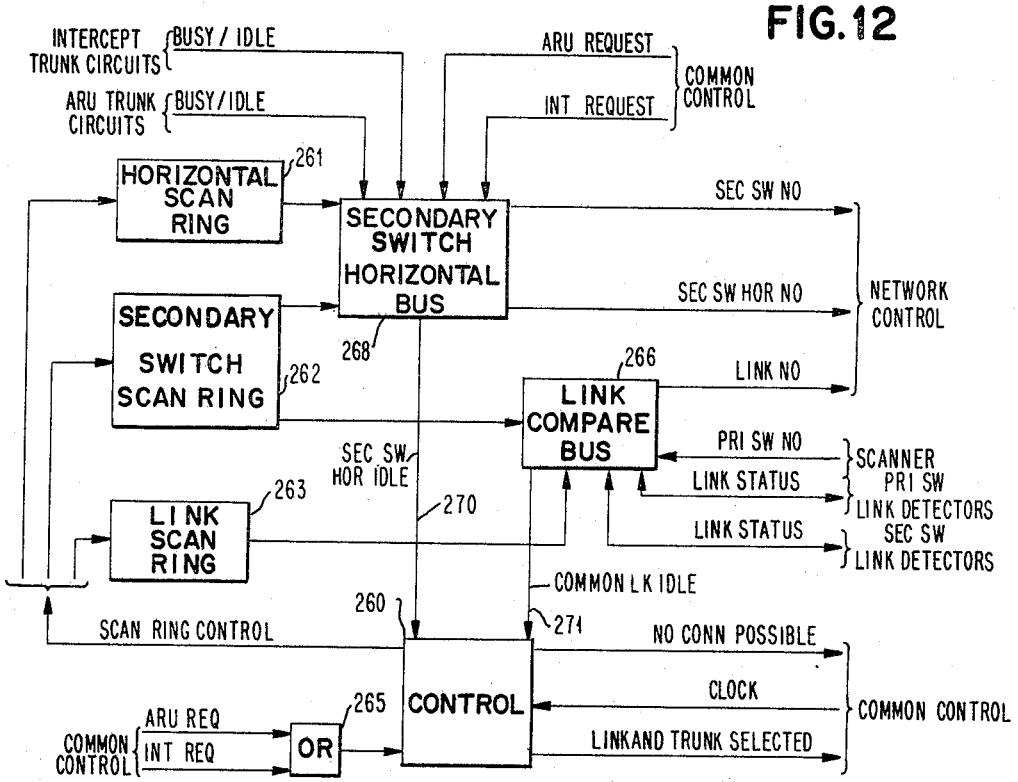
Figure 13:
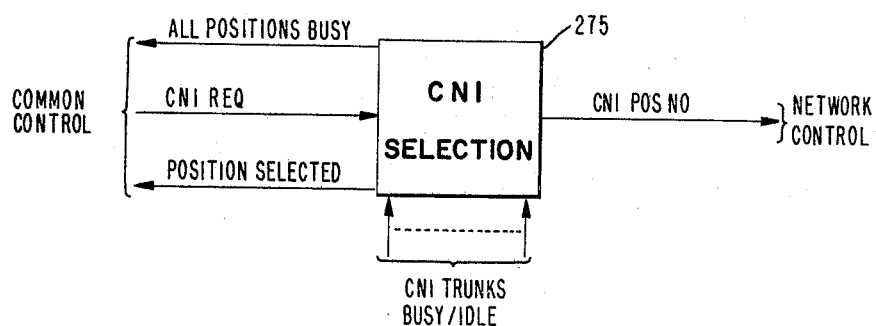

FIGURE 7 reveals an audio response unit trunk;

FIGURE 8 illustrates the intercept trunk configuration;

FIGURE 9 shows the typical inquiry trunk which a special operator might employ in the preferred embodiment;

FIGURE 10 is a general block diagram illustrating the association of the network control with respect to the other portions of the system;

FIGURE 11 is a functional diagram of the control functions provided by the common controls of the preferred embodiment;

FIGURE 12 presents the arrangement of logical functions accomplished by the link and trunk selection circuitry of the preferred embodiment; and FIGURE 13 illustrates the logical interconnections for the circuitry which provides called number identifying operator position selection.

Figure 1:
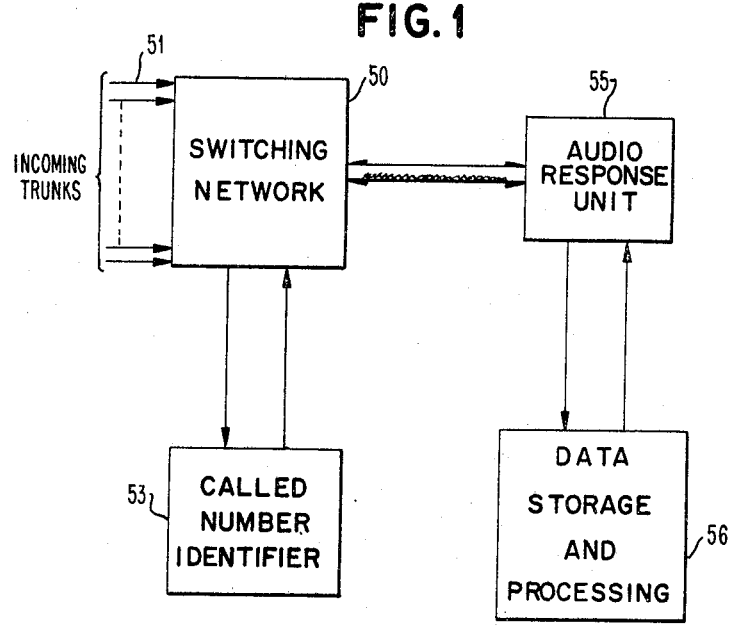

FIGURE 1 is a somewhat idealized general block diagram included herein solely to provide a general understanding of the overall operation of a telephone intercept switch system in accordance with the present invention. The switching network 50 receives a plurality of incoming lines such as 51 from a routing arrangement within a telephone company operation which provides automatic call intercepting in a well known manner. As mentioned hereinbefore, these interceptions, can result from any of a variety of reasons that render it impossible to complete an attempted connection. In the past, these calls had to be directed to a human operator who had to rely upon a special directory to determine why the call could not be completed.

The incoming lines 51 at the incoming trunk usually would be capable of producing one of two different types of service requests as will be described in greater detail for FIG. 3. More particularly, one type of service request at line 51 might indicate that the intercepted calling party has received a standard recorded announcement but did not return his phone on hook thereby indicating he required operator assistance.

A second form of call would indicate that this service request is the first effort to service the subscriber's connection and that no other assistance has been given the subscriber up to this time. This type of call would be immediately referred through the switching network 50 to the called number identifier 53. The called number identifier in the preferred embodiment discussed subsequently is essentially a station occupied by a human operator who performs no other function than to ask the intercepted subscriber what number he has attempted to call, the operator keying this number into audio response unit 55. After this keying, the operator is automatically removed from the circuit and is available to handle another call. Data concerning all anticipated intercept numbers is stored in unit 56. Upon receipt of the number identifying signal from identifier position 53, unit 56 will interrogate its storage and compose a reply as a result thereof to be generated by the audio response unit 55 and transmitted back to the subscriber at the incoming trunk.

In this description, the called number identifier will sometimes be referred to as the CNI function or operator whether the function involves the use of an operator position or the use of automatic number identifier signal equipment. For instance, the system could include a buffer for receiving the dialing signals and analog to digital converters for providing the same type of key input to units 55 and 56 which the CNI operator provides. Special operators sometimes referred to as SI (Special Intercept) operators can be connected to the system to handle any calls that canont be automatically processed or which are processed and a time-out has passed.

Figure 2:
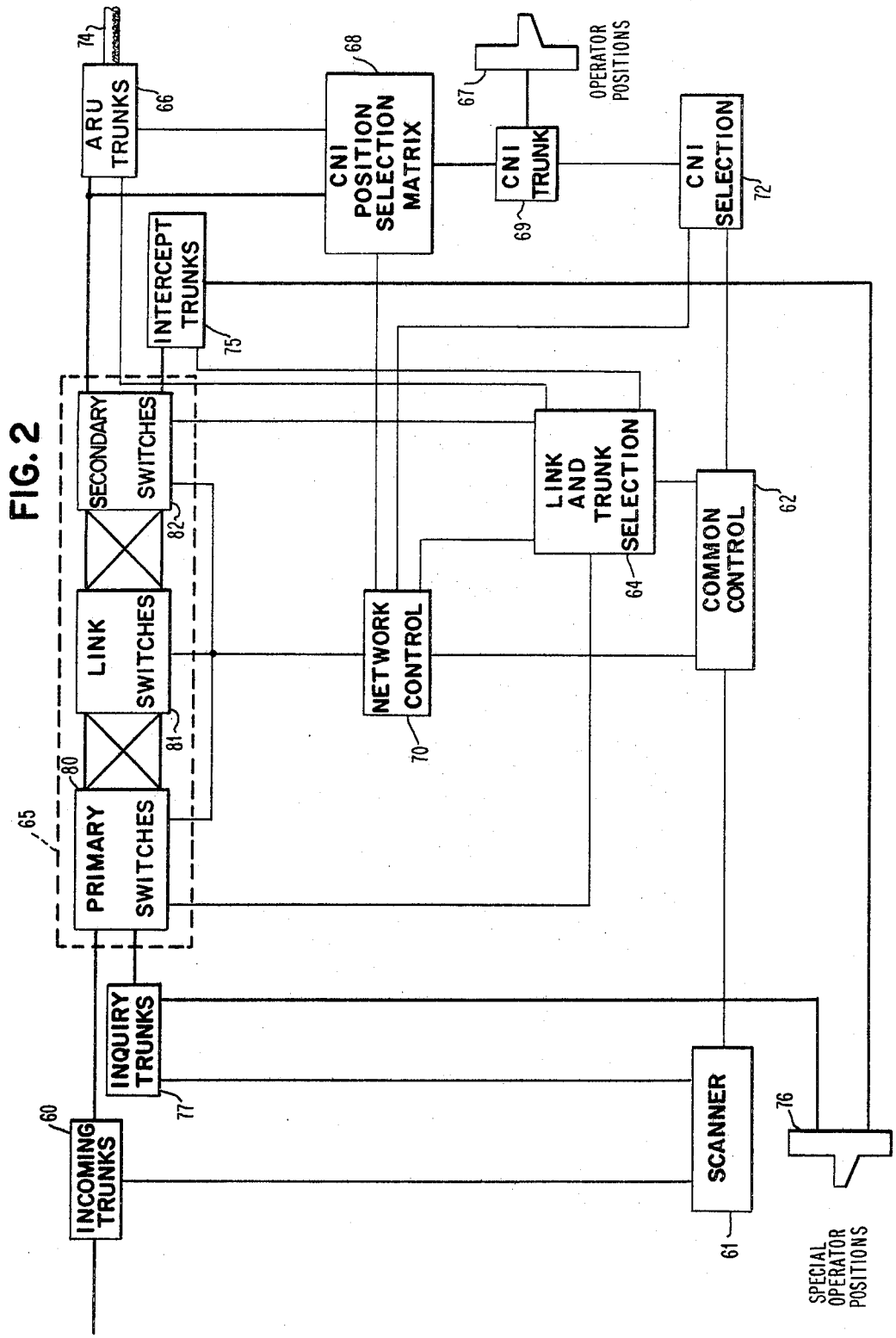

The block diagram of FIGURE 2 illustrates the organization of the preferred embodiment of the present invention and shows the orientation of the switching network and operator positions with respect to each other. It should be noted that the heavier interconnecting lines indicate both talk and control paths while the standard weighted lines indicate only control connections. The incoming trunks 60 receive intercept service requests such as are generated by a telephone company and the processing each is to receive by the system is indicated by the line levels of the incoming trunks itself as will be better understood from the description for FIGURE 3 hereinafter. That is, some service requests will indicate a presence of a call which is to be initially directed to the audio response unit (ARU) via ARU trunks 66 whereas another type of service request may indicate it be directed immediately to a special operator position 76 for immediate human intervention. Each incoming trunk 60 will be capable of producing either type of service request as will be apparent in the discussions of a typical incoming trunk 60 shown in FIGURE 3.

To understand the system operation, assume that an incoming call has caused a service request on a trunk 60 which is to have an audio response automatically composed therefor. This incoming trunk 60 will eventually be sampled by scanner 61. Scanner 61 upon recognizing a service request at incoming trunk 60 will provide an indication to common control 62 and will cease scanning until common control 62 indicates that it should resume scanning of subsequent lines. Common control 62 determines whether or not a CNI connection is required and will so indicate to CNI selection circuit 72 when appropriate. The link and trunk selection circuit 64, based upon an indication of what type of connection is to be made and the location of that connection in incoming trunks 60, will ascertain whether or not a connection can be made through concentrating network 65 to an ARU trunk 66 and to a called number identifier operator position 67 through CNI position selection matrix 68. In the event that such a connection is possible, the network control 70 will have the appropriate connections through network 65 and matrix 68 identified to it by scanner 61 and selection circuit 64. Common controls, 62 directs at the appropriate time that these connections be energized to cause the subscriber at the incoming trunk 60 to be connected through the switching sections of concentrating network 65 (which will be discussed in more detail for FIGURE 5) through matrix 68 to a CNI trunk 69 and accordingly an operator position 67. Common control 62 will force scanner 61 to continue if it is not possible to service the service request on that cycle. On the next cycle, scanner 61 will once again attempt to service the request, however.

When the connection has been made, an audio path is completed between the CNI operator at 67 and the incoming trunk 60. The operator would challenge the calling party to ascertain the called number. The operator would then key this number into the ARU trunk 66 connected thereto which would pass this number on through cable 74 to an audio response unit and data storage and processor configuration. This audio response system could be similar to that illustrated in Patent 3,209,074 entitled "System for Multiple Output of Spoken Messages" by W. K. French and which is assigned to the International Business Machines Corporation and could operate with any suitable computer. After keying the number into the ARU trunk 66, the CNI operator is automatically removed from the connection and the subscriber from incoming trunk 60 is connected directly to an ARU trunk 66 through network 65.

If the service request at incoming trunk 60 indicates that the call is to be handled by special operator intervention, network control 70, link and trunk selection 64 and common control 62 will determine whether or not a connection can be made through concentrating network 65 through one of intercept trunks 75 to a special operator position 76. If so, the connection is completed and the special operator attempts to handle the call by direct conversion with the subscriber. If the special operator desires to determine what type of response the audio response unit provided to the subscriber, a request can be keyed through primary trunk 77 which is generally handled much like a service request on an incoming trunk 60 except that no CNI connection is needed. That is, the scanner 61 in cycling through and sampling each of the incoming trunks will also scan the inquiry trunk 77. Upon finding an inquiry trunk request, scanner 61 will stop and the appropriate connection will be determined if possible. If the connection cannot be made, the inquiry request will be temporarily ignored and scanner 61 will continue to scan the other trunks and attempt to service this request on the next cycle.

The inquiry trunk appearances are connected only to ARU trunks 66 whenever appropriate connections are completed through concentrating network 65 and the special operator after connection is established thereto will key the number called into the ARU trunk. A special indicator bit will denote to the ARU that the request is a special operator request and, to minimize the processor and ARU trunk time required, an abbreviated or special return message would be provided to the special operator to the exclusion of the subscriber. The special operator would then remove the inquiry request and return to the audio connection to the incoming trunk 60 back through intercept trunk 75 and concentrating network 65 which connections had been maintained continuously during the inquiry to the ARU trunks.

The function of concentrating network 65 is to permit the concentrating of a large number of incoming lines and inquiry trunks into a considerably smaller number of ARU and intercept trunks. For instance, in one system actually constructed in accordance with this invention, a maximum of 210 incoming trunks 60 and 14 inquiry trunks 77 could be concentrated down into 64 ARU trunks 66 and 14 intercept trunks 75 with a maximum of 22 CNI trunks 69 being employed. The system of the concentrating network 65 must be arranged so that any appearance of an incoming trunk to primary switch 80 must be capable of connection to any ARU trunk 66 or intercept trunk 75 through link switches 81 and secondary switches 82. Also, any appearance of an inquiry trunk 77 to primary switch 80 must be capable of connection to any ARU trunk 66 through link switches 81 and secondary switches 82. This type of concentrating network will be described in somewhat greater detail with respect to FIGURES 5 and 6.

Reviewing the operation of the FIGURE 2 block diagram, the scanner will determine the presence of either an incoming trunk 60 or inquiry trunk 77 service request and will immediately stop scanning until instructed by common control 62 to continue. Common control 62 will force scanner 61 to continue in the event that the service request cannot be serviced or will force scanner 61 to continue when the connections desired have been made. Link and trunk selection circuitry 64 will have identified thereto whether the call requires an ARU connection or an intercept trunk connection and will determine whether the appropriate connection can be made to an ARU or intercept trunk 66 or 75 through link switches 81 and secondary switches 82 of concentrating network 65. In addition, CNI selection circuitry 72 will determine whether or not a CNI position is available to handle a call in the event that such is necessary. If the circuit connections can be made to handle the appropriate call, common control 62 will cause network 70 to complete the connections and then force scanner 61 to continue. It should be noted that considerable duplexing of equipment could be employed in this system for purposes of reliability of operation. In fact, in the system actually built, the following units were duplexed in whole or in part: Scanner 61, Common Control 62, Link and Trunk Selection 64, Network Control 70, and CNI Selection 72. There are many other functions which can be associated with this type of system but which will not be described in the interest of brevity. That is, the operation of the duplex circuitry or the testing and tracing of various types of troubles and calls can be included. Supervisory equipment for monitoring operator performance and traffic density could also be included. Hybrid positions which can operate as either special operator position 76 or CNI operator positions 67 could also be utilized. Configurations for performing all of the foregoing functions will be readily apparent to those having normal skill in the art.

Figure 3:
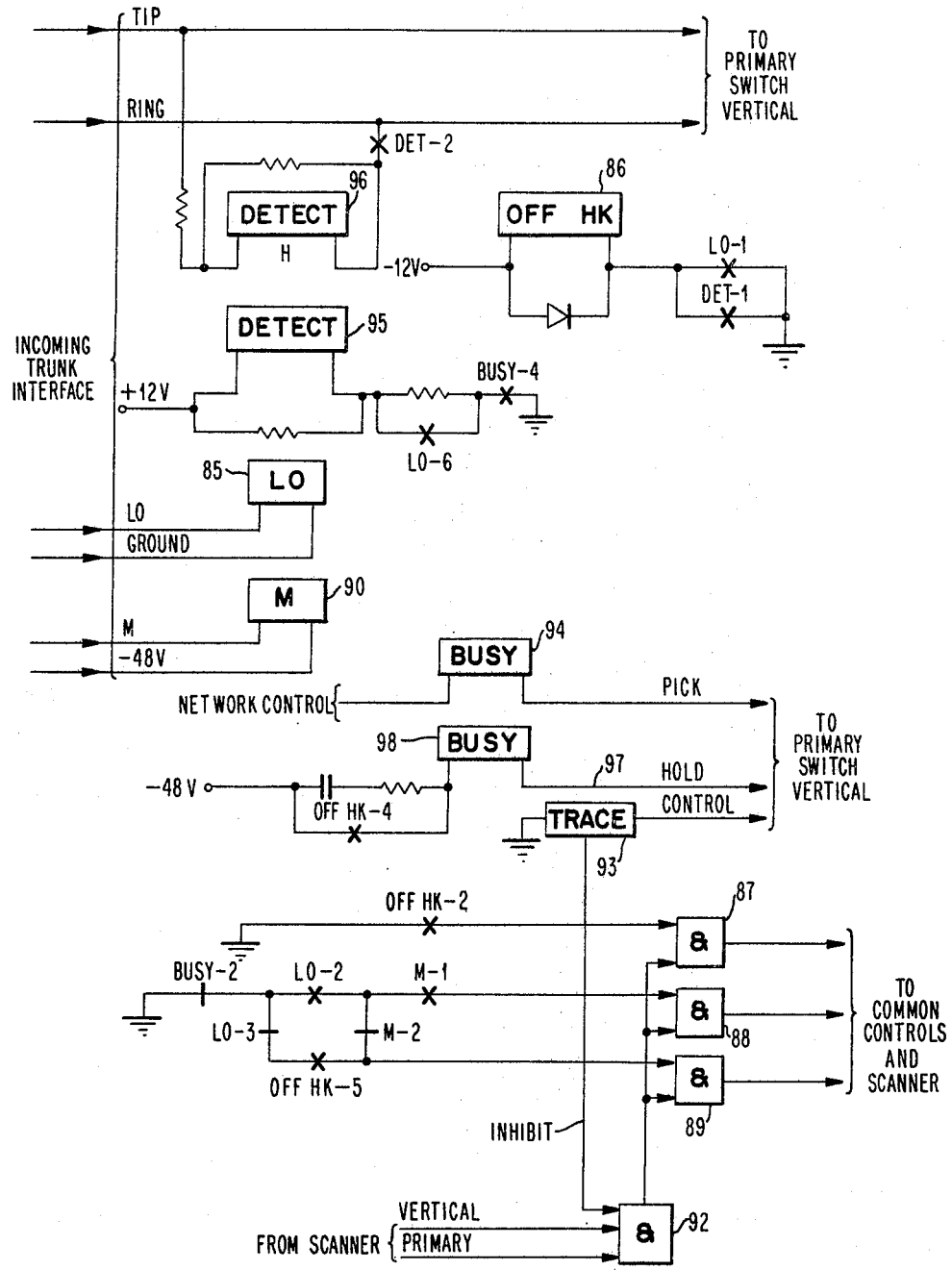
FIGURE 3 illustrates a typical incoming trunk arrange for use in the FIGURE 2 environment.

A typical incoming trunk which might be employed in conjunction with a preferred embodiment of the present invention is illustrated in FIGURE 3. In this drawing as well as in the other drawings the convention will be used of an X in a line for a normally open contact (such as LO-2) while a cross-bar indicates a normally closed contact (such as LO-3). Each incoming appearance essentially consists of the tip, ring, LO and M leads with a ground and —48 volt potential being supplied for each pair of incoming trunks. That is, the ground and —48 volt lines shown in FIGURE 3 as part of the typical incoming trunk would be shared with another series of tip, ring, LO and M leads. The tip and ring leads constitute the talking path and the LO line is a service request indicator which initiates connection of the system with this particular trunk. The placing of battery potential on LO causes the LO-1 and LO-2 contacts to close and the LO-3 contact to open. The closing of LO-1 places potential on off hook relay 86 which in turn closes the OFF–HK-2 contact to condition one input of AND circuit 87. At the same time, the operation of LO relay 85 causing LO-2 and LO-3 to close and open respectively will place a conditioning signal on either AND circuit 88 or 89. If the particular appearance is to be ultimately directed to a call number identifying operator and subsequently to the audio response unit and processor for formulation of a reply, ground is placed upon the M lead which causes M relay 90 to be energized. As a result, relay contact M-1 is closed while contact M-2 is opened thereby conditioning AND 88 while preventing conditioning of AND 89. Thus an output signal from 87 will indicate off hook condition and either an output from AND 88 will indicate a call to be handled with a CNI operator or an output from AND 89 will indicate that the call should be routed to a special operator for immediate intervention and handling. The latter circumstance could arise whenever an intercepted call had received a recorded reply from some other device and the subscriber had remained off hook beyond a timeout.

The scanner will be continuously scanning the incoming trunks as will be described hereinafter in FIGURE 4. Thus at a particular time, both the vertical and primary inputs of AND 92 will be conditioned which, in the absence of inhibit signal from the trace circuit 93, will provide the final conditioning of AND circuit 87 along with either 88 or 89 to provide an indication to common control that there is a service request at this incoming trunk requiring a particular type of servicing. If the common control and other call directing circuitry finds that there is a possible path that can be connected, a pick signal will be introduced from the network control to the pick lead of busy relay 94 and cause it to be energized. As a result, the hold signal will be placed on the hold lead 98 of the busy relay which will remain energized as long as the off hook relay 86 is actuated. Closing of the busy relay would cause the BUSY–4 contact to close thereby energizing the pick lead 95 of the detect relay. Detect relay 95 will then place a resistance across the tip and ring leads and hold itself by means of detect relay 96 and DET–2 contacts until such time that the tip and ring circuit is opened at the incoming interface. Under normal operation, this occurs when the subscriber hangs up or goes on hook. The operation of this relay also energizes DET–1 contact which will now hold the off hook relay 86 on until the subscriber goes on hook, even though the LO level will be removed from the interface by the external intercept circuits.

The primary switch vertical outputs of the FIG. 3 trunk is one input line for the concentrating network. If the incoming trunk had been coupled to an ARU trunk and a timout or disconnect signal had been generated for some reason, the ARU trunk will release the hold circuit which is maintaining a potential on line 97 and thus drop the busy relay 98. This will result in the service request indication to common control by outputs of both AND 87 and AND 89 being energized since BUSY–2 contact will return to the closed state. As mentioned, the LO battery would have already been removed, LO–3 will already have been returned to its normally closed position by the incoming trunk after its service request was honored and the continued holding of detect relay 95 will maintain off hook relay 86 energized and therefore OFF HK–5 contact will be closed conditioning one input for AND 89. Subsequently, the scanner will detect this as a service request requiring connection to a special intercept operator position. That is, the result will be the same as if the M relay 90 had not been grounded in the first place, the situation when a special intercept operator is to be connected to the incoming trunk immediately.

Figure 5:
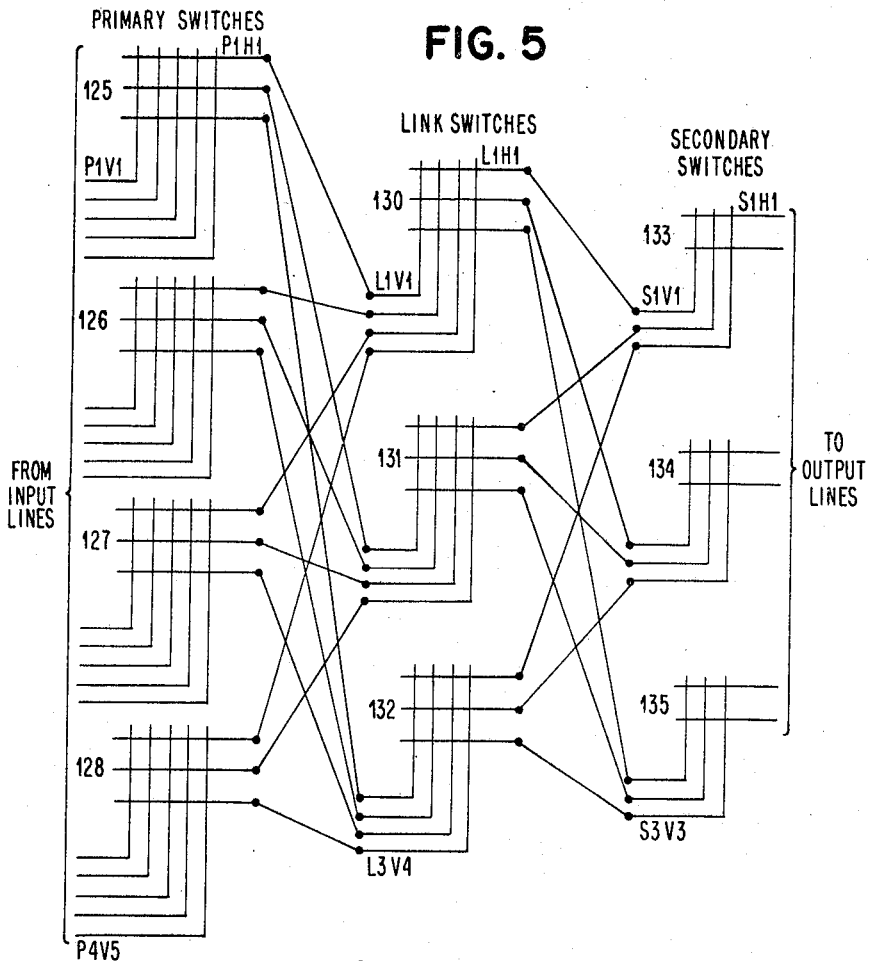
FIGURE 5 shows a simplified matrix configuration such as might be used for concentrating network connections.

It should be noted that the each incoming line to the primary switch vertical of a concentrating network from a FIG. 3 incoming trunk (the same being true for inquiry trunks) is shown in FIG. 5 as a single line but actually is composed of five lines as can be seen in FIG. 3. The same would be true for inquiry trunk to concentrating network connections. The control connections are utilized predominantly for tracing purposes and in general will not be described. For the CNI selection matrix, the lines utilized actually include two other leads, an additional tip and ring connection being included for keying into the ARU trunk while the CNI operator is connected to the subscriber's talk path.

Figure 4:
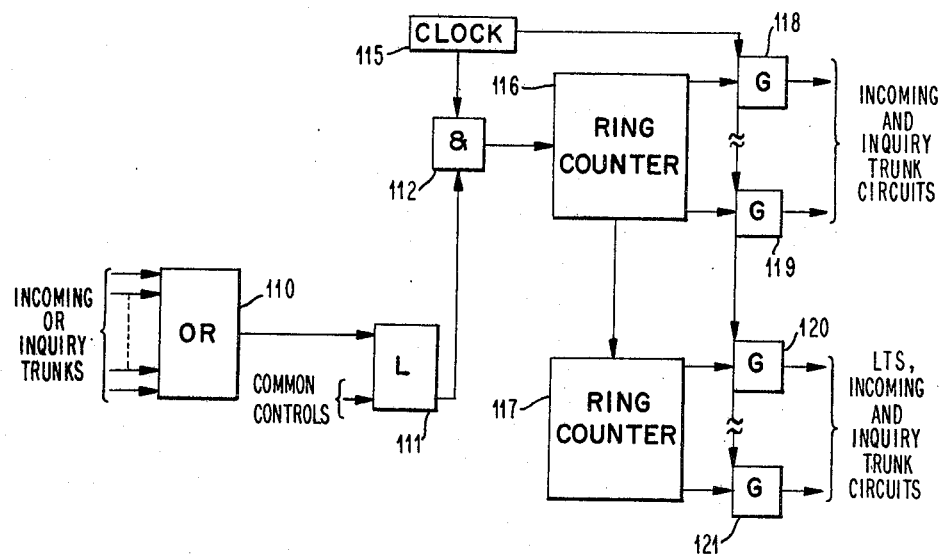
FIGURE 4 is a diagram of a scanner utilized in the FIGURE 2 embodiment.

A typical scanner to interrogate for service requests is shown in FIGURE 4. The absence of any service request from the incoming or inquiry trunks into OR circuit 110 will leave latch 111 so as to condition AND circuit 112. Continuously running clock 115 will therefore introduce pulses to ring counter 116 which, for each cycle thereof, will pulse ring counter 117. The particular count in ring counter 116 at any given instance will condition one and only one of the plurality of output gates such as 118 and 119 while the output of ring counter 117 will likewise be conditioning one and only one of a plurality of output gates such as 120 and 121. Between the pulses introduced to counter 116 from clock 115, clock 115 will introduce a single strobe pulse to condition all of gates 118–121 with this conditioning occuring for a very brief period. Thus, one gate of the series including 118 and 119 will be producing an output signal to an incoming and/or inquiry trunk vertical line such as partly conditions AND 92 of FIG. 3 while one gate of the series including 120 and 121 will be actuating all of the primary lines such as would complete the conditioning for AND 92 of FIG. 3 thereby uniquely defining one incoming or inquiry trunk. By way of example, at some point in time gate 118 might be conditioning all of the vertical inputs to the equivalents of the AND 92 circuit of all the first trunks in all the groups of trunks while gate 120 is conditioning the primary lead for equivalents of AND 92 in all trunks of the first group of these trunks. The conditioning levels would thereby define the first trunk of the first group since this would be the only trunk having all signals needed to condition its AND 92. This unique pair of output signals is introduced to an AND circuit such as AND 92 of FIGURE 3 to determine the presence of a service request. If the AND circuit 88 or 89 of a FIGURE 3 trunk should produce a service request, a signal will be introduced through OR 110 of FIGURE 4 so as to set latch 111 thereby removing the conditioning signal from AND 112 and preventing the scanner from proceeding further until directed to by the signal from common controls resetting latch 111 and reconditioning AND 112.

FIGURE 5 shows a simplified arrangement of a concentrating network such as might be utilized in the present invention. In this illustration, four groups of five input lines are shown whereas in the actual embodiment constructed 15 groups of 15 input lines each were utilized. This particular illustration is used here however, since the greater number of lines is not needed for a full understanding of the operation of the concentrating network. As mentioned before, the concentrating network provides path interconnections between incoming trunks and inquiry trunks and the ARU trunks as well as between incoming trunks and intercept trunks.

Each of the primary incoming lines is grouped in groups of five as a primary switch such as primary switch 125, 126, 127 and 128. Each input line can be referred to by its group and line number (as defined by the scanner) such as primary switch 1 vertical 1 (P1V1) through primary switch 4 vertical 5 (P4V5). Note that there is a connection possible from any incoming line to any output line from the secondary switches. Thus, the total utilization of any one of link switches 130, 131 and 132 cannot prevent a connection from any primary vertical to any one of secondary switches 133, 134 and 135. Restated, if link switches 130 and 131 are completely blocked for some reason, a connection can still be made from any one of the incoming lines for primary switch 125 to any horizontal of any of the secondary switches 133, 134 and 135 and thence to any of the output lines. In the preferred embodiment, the input lines to primary lines to primary switches 125–128 are composed of intermixed lines of the inquiry trunks from the special operator positions and the incoming trunks such as is illustrated in FIGURE 3. Referring briefly to FIGURE 2, it should be noted that each special operator position has its own unique inquiry trunk into the primary switches of the concentrating network.

Each of the crosspoints shown in FIGURE 5 (such as the intersection of P1V1 and P1H1) would include several lines. The CNI position selection matrix shown in FIGURE 2 is a rectangular, non-blocking matrix which provides full access between 22 CNI trunks and 64 ARU trunks.

Figure 6:
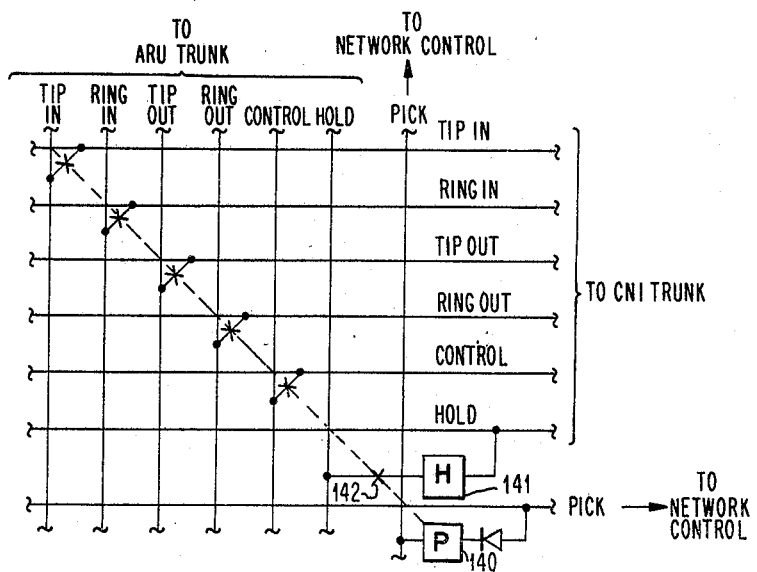
FIGURE 6 illustrates a typical crosspoint connection utilized in the called number selection matrix in the preferred embodiment of this invention.

In FIGURE 6, a typical crosspoint of the CNI position selection matrix is illustrated. It should be understood that the concentrating network crosspoints employed in the FIGURE 5 illustration would be substantially the same as that shown in FIGURE 6 except there would be one less tip connection and one less ring connection on both horizontal and vertical. When a path has been determined to be available through the concentrating network or through the CNI selection matrix, the network controls will cause potential to be placed on the pick lines thereby energizing the pick relay 140. This immediately causes the contacts thereof ao close and to connect all of the vertical lines to the horizontal lines. In so doing, the lines connecting the hold vertical with the hold horizontal are also connected to relay 141 which, after removal of pick current from relay 140, will continue to hold all of the crosspoint contacts including hold contact 142 in the closed condition. The additional tip and ring horizontal and vertical which is shown in FIGURE 6 but which is not needed for concentrating network crosspoint are required for the purpose of permitting the CNI operator to talk to the subscriber at the same time that the called number is being keyed into the ARU trunk without the subscriber or the CNI operator hearing the keying. Through the concentrating network, this dual function is never performed.

A typical ARU (audio response unit) interconnecting trunk is shown in FIGURE 7. When the trunk is available and operational, busy switch 145 is closed thereby providing an indication to the link and trunk selection circuitry (LTS) that this trunk is available. When the trunk is to be selected, a signal is produced from common controls on hold control line 146 which ensures that latch 148 is cleared and that hold control 150 has caused hold relay 151 to clear. Removal of the signal from hold control lead 146 then causes hold relay 151 to be picked which results in closures of contacts 152 and 153.

The closure of contact 152 places the hold potential from the concentration network onto busy relay 155 whereas the closure of contact 153 places potential on the hold circuitry of intercept operator relay 156. Busy relay 155 opens contact 154 indicating to LTS that the selection has been made and this trunk is now not available for service requests. Relay 156 would be energized from the network control if the connections being set up to this ARU trunk are the result of an inquiry request from a special operator position which are routed through an inquiry trunk. That is, the signal from the network controls in relay 156 would pick this relay, close contact 173, and, in conjunction with closure of contact 153 will cause a hold current to be placed on relay 156.

The closing of busy relay 155 causes the opening of a contact 157 which will cause an input to timeout circuits 158. If within a selected period of time signals are not received over line 159 to indicate functioning of the audio response unit and processor, the timeout circuits 158 would cause hold controls 150 to release relay 151, open contact 152 and 153, and thus break down the ARU trunk connection. This could also cause indications useful for maintenance and repair procedures but these will not be described herein. Opening of contact 152 will break down the hold path through the concentrating network while opening of 153 will provide the same function for the CNI connection, if any.

After a connection has been made through the concentrating network, the subscriber would be connected to the horizontal tip lead 160 and ring lead 161 and initially would be connected to the CNI operator through the vertical ring connection 162 and tip connection 163. Resistances would initially be placed between the secondary of the audio response unit output transformer 165 thereby attenuating this audio path. The CNI operator is able to talk to the subscriber by the tip 160–163 and ring 161–162 connections, ascertain the number which the subscriber originally dialed, and will key this number into the audio response unit by means of the tip 1 lead 166, ring 1 lead 167 and control lead 168. This output is connected to detector translator 170 and decoded thereby to provide an output on lines 171 into the audio response unit and processor. It should be noted that an appropriate arrangement for the keying and detector/translator operation is described in the article entitled "Keyset to Transmission Line Encoder" by A. A. Friedrich, H. F. Oeters and J. M. Regan in the IBM Technical Disclosure Bulletin, vol. 7, No. 9, February 1965, at pages 851 and 852. The system described in this article makes it possible to require only three interconnecting lines to transmit ten numbers and a plurality of functions. In the present embodiment, only keying of a start function and a reset function is needed. The number of lines per crosspoint through the concentrating network and CNI matrix is thereby markedly reduced.

When the number has been keyed into translator 170 and the start button energized by the CNI operator, a start detect signal will be produced on line 172 to reset latch 148 thus energizing disconnect operator relay 174. This also provides a second input to timeout circuits 158 which after an appropriate passage of time will determine whether or not any response is being produced by the audio response unit. It should be noted that, in the event that a signal has been introduced through lines 171 to the ARU unit which cannot be handled by that unit, line 159 can be employed to provide a quick disconnect through timeout circuit 158 and hold control 150.

Operation of operator disconnect relay 174 will cause normally closed contact 175 to be opened thereby releasing the hold lines into the CNI matrix and intercept operator relay 156. In addition, normally open contacts 176 and 177 will be closed placing the subscriber who is directly connected to tip 160 and ring 161 connections across the secondary of transformer 165 so that the unattenuated signal produced by the audio response unit can be heard by the subscriber. The opening of the hold line to the CNI matrix will have released the connections through the CNI matrix so that the CNI position will be disconnected from the subscriber and will be available to handle another call.

In the event that the request for an ARU trunk had been generated by a special operator through the appropriate inquiry trunk and appropriate connections set up through the concentrating network, the network control would operate intercept operator relay 156. This would result in contacts 182 and 183 being closed thereby placing the tip 160 and ring 161 connections so as to permit keying into detector/translator 170 by the special operator. The actual keying is accomplished using the contact 182 and 183 connections in conjunction with the connection of control lead 178 to detector 170. At the same time, normally closed contacts 184 and 185 are opened to remove the operator from the audio circuit. After the special operator has keyed the number in the detector/translator and energized the start button, the actuation of start detect line 172 and operator disconnect relay 174 will cause intercept operator relay 156 to be dropped thereby automatically placing the special operator across the connections to audio transformer 165 in order that this operator may hear the response provided.

Although the control leads 168 and 178 are connected to trace circuitry 180, the operation of this particular circuitry is incidental to the present invention and therefore will not be described. After the audio message has been returned through transformer 165, the audio response unit will indicate by means of line 159 to timeouts 158 that a timeout should be commenced. After a brief period of time (8 to 16 seconds, for instance), the timeout 158 will cause the hold circuits by means of hold relay 151 to be released and, if the subscriber has not returned on hook, will cause the hold path through the concentrating network to open and will further cause the subscriber's appearance to provide the service request requiring special intercept operator assistance as was described hereinbefore for FIGURE 3. That is, in FIGURE 3 an output would be produced by AND circuit 89 since LO–2 would be open, LO–3 and OFF HK–5 would be closed, and release of the hold circuit would result in the BUSY–2 contact returning to the closed state thereby conditioning AND 89. AND 89 output indicates to the scanner that a special intercept operator connection is required.

In FIGURE 8, the intercept trunk interconnections between the intercept operator positions and the concentrating network output are shown along with the connections of the prefered embodiment between the intercept operator position and the inquiry trunk. In the event that the operator position is occupied and available, position available line 190 will be energized which causes position available relay 191 to be actuated through order tone control circuit 192. This causes normally open contact 193 to be closed and an indication to the link and trunk selection circuitry that this particular intercept operator trunk is available for connection to a subscriber. When the link and trunk selection and common control circuitry has decided that this intercept trunk is to be chosen, a signal is provided from common control through hold control 194 to cause hold relay 195 to be picked thereby closing the contact in hold line 197. This conditions busy relay 198 for actuation when the path through the concentrating network is set up and the hold line 197 is energized. Actuation of busy relay 198 causes a potential to be applied to order tone control circuitry 192 as well as opening of contact 213. This results in contact 193 also opening which indicates to the link and trunk selection circuitry that this special operator position is not available. Within order tone control circuitry 192 is logic for disconnecting tip lead 199 and ring lead 200 from the operator, placing an alterting signal on the tip and ring output leads 201 and 202 and returning the connection of tip lead 199 to tip lead 201 as well as ring lead 200 to ring lead 202 thereby completing the connection between the operator and the subscriber. The actual alerting signal is generated by sampling the output of a tone generator.

The intercept operator can then converse directly with the subscriber by means of the aforementioned connection through the concentrating network. When the operator determines the number which the subscriber had attempted to call, the operator could, after connection has been established to the ARU trunk through the concentrating network, key this number by means of cable 205 into encoder 206 if the operator should desire to hear the ARU response thereto. When the start indication is generated, encoder 206 causes start detect relay 208 to be energized. It should be noted that the keying and encoder operation is also operationally the same as that described in the article in the IBM Technical Disclosure Bulletin, volume 7, No. 9 of February 1965 at pages 851 and 852.

The actuation of relay 208 causes contact 209 to be closed thereby energizing audio response relay 210 which causes the operator's tip and ring connection to be placed onto the inquiry trunk tip and ring leads 211 and 212 and disconnected from the subscriber's tip and ring leads 199 and 200 by opening normally closed contacts 203 and 204. To initiate connection of the operator position and an ARU trunk, a signal is applied from the operator position to the request line so that the operator's position could be serviced as an ARU request. The signal applied to the request line (REQ) 214 is operationally somewhat similar to the application of a signal to the LO line by an incoming trunk as will become more apparent hereinafter in conjunction with FIGURE 9. The connection of an ARU trunk to the inquiry trunk through the concentrating network will cause a signal to be returned to the operator position over the GO line at which time the intercept operator would key in the signal to the encoder 206. The encoder 206 would cause the number to be transferred over tip 212, ring 211 and the control lead to the inquiry trunk which, after the start signal, will receive the special response for an intercept operator as generated by the audio response unit.

When the operator has heard the response, the signal is removed from the request line thereby causing start detect relay 208 to drop and consequently causing audio response relay 210 to drop. Relay 210 will thus return contacts 203 and 204 to the normally closed state thereby removing the operator from the inquiry trunk and placing the tip 201 and ring 202 leads back in communication with the tip and ring leads 199 and 200 to which the subscriber still is connected. It should be noted that the CNI operator position would be substantially the same as this intercept operator position except the CNI operator's headset is continuously connected to the tip and ring connections to which the subscriber is connected and the encoder output for the CNI operator is the only connection to the tip 1 and ring 1 connections to the ARU trunk.

FIGURE 9 shows the inquiry trunk interfacing between the concentrating network primary switches and the special operator position as described in FIGURE 8. A level on the inquiry request input line from the special operator position causes request relay 215 to be actuated. This causes REQ 3 contact to be closed and, since neither the OFF HK-3 nor the BUSY-5 contacts have been opened, conditions AND circuit 216. When the scanner actuates the vertical line and the primary switch lead to which this trunk is connected, an inquiry request output is produced by AND 216 and sent to the scanner to stop the scanning and to the common controls and ultimately the link and trunk selection circuitry for determination of a path through the concentrating network into an available ARU trunk. When a path is found, the network control will energize pick line 217 thereby actuating busy relay 218. Since REQ 2 contact is closed, the hold busy relay 220 will be actuated when the common controls places hold current on this line.

The actuation of busy relay 220 causes BUSY-4 contact to close placing ground on the GO lead which, as can be seen from FIGURE 8, is returned to the special operator position to light a "ready" lamp. This notifies the operator that a connection to an ARU trunk through the concentrating network has been established and keying of the called number can commence. The energization of the busy relay also opens the conditioning lead for AND 216 to remove the service request and permit scanning to continue. In addition, the closing of the busy relay closes BUSY-1 which energizes off hook pick relay 221 which, inasmuch as the request relay 215 continues to be energized, causes the off hook relay 222 to be actuated. This further deconditions AND 216 by the opening of normally closed contact OFF-HK-3. It should be understood that the tip, ring and control leads are connected to the tip, ring and control lead indicated in FIGURE 8 as being coupled to the inquiry trunk. When the call has been completed, the hold busy relay 220 is released and, assuming that the special operator does not release the request line and request relay 215, the off hook hold relay 222 will remain up and precent the conditioning of AND 216. Therefore, any further attempts to service this inquiry trunk cannot be effective until after request relay 215 has been cleared by the special operator.

FIGURE 10 illustrates the input and output connections for the network control 225. When the presence of a service request has been detected by scanner 226, the scanner will indicate to the network control the identity of the primary switch and vertical line on that primary switch which is producing the service request. This establishes the end mark for the primary switch end of concentrating network 229. The link and trunk selection circuitry 228 will indicate to the network control 225 which ARU trunk or intercept trunk is available for the other end mark thus defining both end marks for the concentrating network 229. More particularly, the second end marks are established by the secondary switch number and the secondary switch horizontal line on that switch. In addition, the link and trunk selection circuit 228 will indicate which link connection is to be closed by the network control to complete the connections through the concentrating network 229. If a CNI operator position is to be connected, the CNI selection circuitry 230 will indicate the end marking of the CNI matrix 231. Since the ARU trunk 238 is already identified, it is only necessary to end mark the CNI matrix 231 on the CNI trunk side to complete this connection. Common control will indicate to the network control 225 when to actually energize the drivers 233 which results in the closing of one crosspoint connection in the link switches of the concentrating network 229 and the application of pick current to the end marks of the concentrating network. The end marks actually are connected to the pick paths for incoming trunks 235 or 236, and CNI trunks 231 where applicable. The connections for completing the pick path at the secondary switch end of the concentrating network 229 is a series of contact points which complete the desired circuits to ground when closed. The hold path will be completed and hold current will maintain the connection thereafter. In addition, the ARU trunk 238 would receive a signal to operate the intercept operator relay thereof if applicable. The circuitry utilized for network control 225 can be a simple, well known relay tree for selecting one out of 225 possible primary vertical lines for placing pick potential thereon, one out of twelve link connecting lines and one out of 81 secondary switch horizontal lines in accordance with the instructions provided by CNI selection 230, scanner 226 and LTS 228.

FIGURE 11 illustrates the basic functions performed by the common control circuitry utilized in the preferred embodiment of the present invention. All of the functions of common controls are coordinated by clock 240 which also provides output pulses to the link and trunk selection circuitry. The request for service of an incoming trunk call which has caused the scanner to stop scanning also provides an indication of the presence of a call and the type of a call to the request control circuitry 241. That is, if the particular call must be handled with a CNI operator or an intercept operator, then the appropriate lines from the incoming trunk would be raised. In addition, in the event that the request is being generated by a special operator, there will be an inquiry trunk input to the control circuitry 241. The control circuitry 241 will produce an output indication to the CNI selector (as will be described for FIGURE 13 hereinafter) if there is a CNI request from the incoming trunk. As its name implies, the CNI selection circuit determines whether or not there is a CNI operator position available and selects one of these positions if it is available.

If the CNI selector does not detect any CNI positions available, a signal will be received over the all positions busy line 242 which will cause request control 241 to place an indication on calls waiting line 243 to the operator positions for the purpose of indicating to them that there are some calls that have not been serviced. At the same time, line 244 will be raised causing an end of sequence control 245 to direct the scanner to resume scanning and not service that particular request.

It should also be noted that, if the request is a CNI request from the incoming trunk or an inquiry request from the inquiry trunk, the ARU request line from control 241 will be raised to the LTS circuitry. The CNI request from the incoming trunk is the only input to control 241 which results in raising of the CNI request line to the CNI selector. If the intercept request line of the incoming trunk is raised, then only the intercept request line is raised to the LTS and no CNI request line is raised.

If there is no indication by the CNI selector that all positions are busy, control will be passed to the LTS and CNI control circuitry 247. This circuitry will receive an indication from the CNI selector circuit that there has been a CNI position selected which must occur since transfer of control to circuit 247 means CNI positions are not all busy. Control 247 AND's the CNI selected signal with a signal from LTS either that there is no connection possible or that there is a link and trunk connection possible. If no connection is possible, an indication will be provided to line 244 that an end of sequence is to be generated and the scanner should advance and ignore that service request. However, if the link and trunk selected line is raised into control 247, then control will be transferred to select relay control 248. This will cause the appropriate drivers to be selected in the network control to set up appropriate connections for establishing a path through the concentrating network and the CNI matrix, if applicable. The selection of a path will be better understood from the description for FIGURE 12 and the raising of line 249 by control 248 simply enables these connections. Actual select control is then passed to hold path and connect control circuitry 250. Control 250 initially will cause a hold control signal to be passed to the ARU trunk and intercept trunk circuitry for hold relay operation as has been described in greater detail hereinbefore with respect to FIGURE 7 and FIGURE 8. This ensures that the hold relays of those circuits have been cleared before they are to be operated again.

Subsequently, control 250 will cause a signal to be raised on line 251 which will indicate to the network control that the appropriate relay connections are to be operated causing the actual picking of the connection path. The network control will return a signal to the control 250 by means of line 252 which will indicate that the relays have been picked. This will also have caused the hold path to be completed and appropriate hold relays to be energized. Thereafter, line 251 will be dropped. A signal is then placed on line 253 to the end of sequence control 245 which indicates that the particular connection has been completed and that the searching and scanning can continue.

It should be noted that in the event that trunks dedicated for automatic number identification are included in the incoming trunks, a special ANI (automatic number identification) request line similar to the CNI request line might be included. In such a system, the request control 241 must additionally have an ANI request output line to the then CNI and ANI selector circuit. For a fully automatic system, the CNI lines of this preferred embodiment would all become ANI lines and the CNI operator positions would be replaced with appropriate converting equipment.

FIGURE 12 illustrates a generalized block diagram of link and trunk selection circuitry that could be utilized in conjunction with the present invention. In the absence of an output from OR circuit 265, clock pulses received from common control are gated through control circuit 260 to permit horizontal scan ring 261, secondary switch scan ring 262 and link scan ring 263 to be continuously counting. The purpose of this arrangement is to provide random starting points in determining paths for completing of connections through the concentrating network and, as an indirect result, through the CNI matrix. If an ARU request or an intercept request is received from common controls for initiating the establishment of a connection, an indication will be received from OR circuit 265 so as to cause control 260 to immediately stop scanning rings 261, 262 and 263 at whatever count they might contain. During the selection functioning that follows, the scan rings 261–263 will be stepped in ordered sequence by control 260 as required. The location of the call originating the request is indicated to the link compare bus 266 by the primary switch number line from the scanner. At the same time, a busy/idle indication for every intercept trunk circuit and every ARU trunk circuit is being introduced to secondary switch horizontal bus 268. Depending on the type of request from common controls, secondary switch horizontal bus 268 will immediately determine whether or not there are any ARU or intercept trunks available on the particular secondary switch identified by the output of scan ring 262 by comparing as an OR function all of the appropriate busy/idle indications thereto.

If, by way of example, common control is providing an ARU request, the secondary switch horizontal bus 268 will ignore all intercept trunks on the particular secondary switch identified by ring 262 and determine if there is any ARU trunk available on that switch. In the event that there is such a trunk available, the secondary switch horizontal idle line 270 will be raised to control 260. At the same time, link compare bus 266 will be examining the link status indications from the primary switch link detectors and the secondary switch link detectors to determine if there is any common link connections available therebetween. Referring briefly to FIGURE 5, as a typical concentrating network arrangement, to illustrate the foregoing, the secondary switch horizontal bus 269 would be inspected to determine whether or not there is any output trunk available in the particular secondary switch identified by scan ring 262. For instance, assume that scan ring 262 has identified secondary switch 133. This means that bus 268 would determine if an output trunk such as S1H1 is available. Assuming that primary switch 125 had been identified by the scanner as the location of the originating call, link compare bus 266 would be concurrently inspecting to determine whether or not there is a common link available such as P1H1 and S1V1. In the event that link compare bus 266 found that P1H1 and S1V1 were idle, this would conclusively indicate that there is a connection available between P1V1 and S1H1.

Returning to FIGURE 12, link compare bus 266 would produce a common link idle output indication on line 271. Control 260 recognizing a favorable indication on lines 270 and 271 would raise the link and trunk selected line to common control which would then cause the completed connection to be operated as was described for FIGURE 11. The network control would know which secondary switch was to be energized and which secondary switch horizontal number was to be energized along with the particular line to be closed by the outputs of busses 266 and 268. In the operation, for establishing a P1V1 and S1H1 connection, the network control would use the secondary switch number and horizontal number to place one end mark potential on S1H1, would use the primary switch number P1V1 to place potential on that position and would use the link number, in this case link switch 130, to close all of the vertical leads on the output of this secondary switch. This would cause a pick current to flow through P1V1, P1H1, L1V1, L1H1, S1V1 and S1H1 and thereby energize the hold circuits therefor. At the conclusion of the picking of this path in FIGURE 5, the link and trunk selection circuitry would have completed its function, the ARU or intercept request would be removed, and the scan rings 261, 262 and 263 would return to continuous cycling.

Conversely, if neither bus 266 nor bus 268 could produce an output for line 270 and 271, the control circuit 250 would then step secondary switch scan ring 262 to the next secondary switch position. After all of the secondary switch positions have been scanned, and if no connection could be found, a no connection possible indication would be indicated to common control which would then force the scanner to resume and remove the request input as was explained for FIGURE 11. If it was found that a secondary switch connection could be made as was mentioned hereinbefore, horizontal scan ring 261 would then choose one of the available secondary switch horizontal numbers for an output from bus 268, while link scan ring 263 would cause selection of a favorable link connection. It should be understood that lines 270 and 271 could actually comprise a pair of lines so as to signal the inverse functions (i.e., no common link idle) and cause control 260 to increment the scan rings. Alternatively, control 260 could contain simple timeout circuitry with sufficient duration to ensure that no output on either 270 or 271 indicates that no output is possible therefrom. For maximum utilization of the system however, the scan ring should be forced to completely search all possible connections for each intercept request or ARU request before providing a no connection possible indication to common control. That is, by utilizing circuitry substantially as shown in FIGURE 12 including appropriate counting by control 260 of the cycles of scan rings 261–263 during a search for a connection, any possible circuit connections in accordance with the type of request generated will be found.

FIGURE 13 is a generalized block diagram of the CNI selection circuitry. To be more specific, a CNI request is received by the CNI selection circuitry 275 from common controls and a busy/idle status indication for each CNI trunk circuit is also received. If all CNI trunk circuits are busy at any given time, the CNI selection circuit 275 will immediately return an all positions busy signal to the common controls with the result as is described hereinbefore with respect to FIGURE 11. In the event that there is a CNI position available, the circuit 275 will indicate that a position can be selected to common control and, at the same time, will indicate the identity of the position to provide network controls with end mark identification for the CNI position selection matrix. It should be appreciated that the network control already has identified thereto the particular ARU trunk that is available and, since any CNI position can be connected to any ARU trunk through the non-blocking, rectangular CNI matrix, the definitions of both the end marks for picking the appropriate CNI trunk to ARU trunk connection are completed.

In the preferred embodiment and in the system which was actually constructed, CNI selection when instructed by common controls to select a CNI position, will always start at the position following the last position selected and make an ordered search for an available CNI position from that point. If the last CNI position was number 6, for instance, the next request will cause the search to begin at position 7 and continue sequentially until an idle position has been found. An idle position will be found since the search for an idle position would not have been commenced if there had been an all positions busy signal.

The system actually constructed in accordance with the present invention in addition to the various circuitry and operations described hereinbefore also included considerable circuitry for the purpose of detecting errors, providing alarms, tracing calls, providing maintenance, protecting components, and duplexing of critical portions to permit a maximum of reliable operation capability. However, these particular circuit configurations and arrangements were not essential to an understanding of the present invention, are within normal skill in the art, and therefore have been omitted herefrom. Furthermore, it will be understood that many of the figures in the foregoing description, FIGURES 10–13 in particular, have been shown as relatively general block diagrams with many blocks actually including several logic functions. However, it should be appreciated that the choice of particular logic circuitry and configurations to implement these blocks will be readily understood by those having normal skill in the art especially in the light of the input and output functions defined therefore and accordingly detail descriptions thereof have been omitted in the interests of brevity. The system is adaptable to utilize time division or multiplex switching as well as processor control switching within the spirit of this invention. An additional advantage of the present invention is that, beyond providing the intercept functions described hereinbefore, the audio response unit and data processor can be concurrently available to provide other operations such as toll rating, general data processing and the like.

While the invention has been particularly shown and described with reference to the preferred embodiment thereof, it will be understood by those skilled in the art that the foregoing and other changes, additions and modifications in form and details may be made therein with-

What is claimed is:
1. A system for producing audio responses to intercepted telephone calls comprising:
   input trunk means for receiving intercepted calls and providing service requests as a result thereof,
   means for providing a signal identifying each called number,
   means responsive to each service request for providing a connection between said input trunk means and said called number identifying means,
   means for storing information relative to each of a plurality of called numbers,
   means responsive to said called number identifying signals for composing audio messages in accordance with information in said storing means, and
   means for coupling the output of said composing means to the said input trunk means which originated the service request.

2. Apparatus in accordance with claim 1 which further includes
   at least one operator position, and
   means for transferring the coupling of said input trunk from said composing means to said operator position.

3. Apparatus in accordance with claim 2 which further includes
   means for providing a number identifying signal from said operator position, and
   means for coupling said identifying signal to said composing means for producing an audio message related to the number identified, said message being received by said operator position.

4. Apparatus in accordance with claim 1 wherein said identifying means includes means for receiving analog signals from said input trunk means representing the number called which caused the intercept and for converting the signals so received into digital signals for transfer into said composing means.

5. A system for producing audio responses to intercepted telephone calls comprising
   a plurality of input trunks for receiving intercepted calls and providing service requests as a result thereof,
   means for concentrating a plurality of primary connections including one connection for each said input trunk to a lesser number of secondary connections,
   means for identifying a called number which results in a service request and for producing an output representative thereof,
   an audio response unit including means for storing information relative to a plurality of called numbers, and
   control means responsive to said service for controlling said concentrating means to connect the said primary connection associated therewith to a said secondary connection and for connecting the selected said secondary connection to said audio response unit, said audio response unit being responsive to said identifying means output for composing an audio message based upon the information contained in said storage means relative to said called number, said audio message being coupled to said incoming trunk through said concentrating means.

6. Apparatus in accordance with claim 5 wherein
   said control means couples said identifying means to the same said secondary connection as said audio response unit in the presence of a first type of received intercept call and which further includes
   at least one operator position, the receipt of a second type of intercept call causing said control means to establish a connection from the said input trunk generating the request through an available secondary connection to the said operator position.

7. Apparatus in accordance with claim 5 which includes a plurality of said identifying means, each of said identifying means being composed of an operator position including means for providing an audio path therefrom to the said input trunk coupled thereto through said concentrating means, said operator position further including means for providing digital information representative of a called number to said audio response unit.

8. Apparatus in accordance with claim 6 which includes a plurality of said identifying means each including means for receiving analog signals from said input trunks and for converting the signals so received into digital signals for coupling to said audio response unit.

9. Apparatus in accordance with claim 5 wherein;
   each of said input trunks includes a marking line which in the presence of a service request for said trunk indicates a first type of request if a first signal is present on the marking line and a second type of request if a second signal is present on the marking line,
   said concentrating means includes a primary crosspoint matrix, a link crosspoint matrix, and a secondary crosspoint matrix,
   a plurality of said identifying means are included each capable of producing a digital output representation of an intercepted called number, and
   said control means includes a scanner, a common control, a link and trunk selection circuit, an identifying means selector, and a network control circuit,
   said apparatus further including;
      a plurality of operator positions capable of producing a digital output representative of an intercepted called number,
      a plurality of inquiry trunks coupled on one side to respective ones of said operator positions and on the other side to some of the inputs of said primary crosspoint matrix, each said inquiry trunk being capable of generating a third type of service request under command of the associated said operator position,
      a plurality of audio response trunks coupling said audio response unit to some of the outputs of said secondary crosspoint matrix,
      a plurality of intercept trunks coupled between respective ones of said operator positions and others of the outputs of said secondary crosspoint matrix, and
      an identifying means crosspoint matrix arranged for permitting coupling of any of said identifying means to any of said audio response trunks, said scanner cyclically testing said input trunks and said inquiry trunks for service requests,
      said common controls responsive to a service request found by said scanner for directing said line and trunk selection circuit to determine a connection for the line requesting service through said concentrating network to an appropriate one of said secondary matrix outputs, said first and said third type service request causing said secondary matrix output to be connected to a said audio response trunk whereas said second type service request causes a said intercept trunk to be connected thereto,
      said common control in the presence of said first type of service request detected by said scanner causing said identifying means selector to select a connection through said identifying means crosspoint matrix for coupling an available one of said identifying means to the selected one of said secondary matrix output,
      said network control having signals coupled thereto by said control means for defining end marks and crosspoints for establishing connections through said concentrating means matrices and said identifying means crosspoint matrix appropriate to the type of service request being processed, said network control completing said connections under command of said common control, said common control forcing said scanner to resume said cyclic testing when a connection is completed and when such completion is not possible.

10. Apparatus in accordance with claim 9 wherein said plurality of identifying means are operator positions each having means for keying a digital output for representing an intercepted telephone called number.

References Cited

UNITED STATES PATENTS 3,111,561 11/1963 Dunning.
3,143,601 8/1964 Joel.
3,133,268 5/1964 Avakian et al. _____ 340—152

WILLIAM C. COOPER, Primary Examiner

U.S. Cl. X.R.

179—6

UNITED STATES PATENT OFFICE
CERTIFICATE OF CORRECTION

Patent No. 3,482,057                 Dated December 2, 1969

Inventor(s)     George F. Abbott et al.

It is certified that error appears in the above-identified patent and that said Letters Patent are hereby corrected as shown below:

Column 17, line 24, after "trunk" insert -- means --; line 55, after "service" insert -- request --.

Signed and sealed this 1st day of September 1970.

(SEAL)
Attest:

EDWARD M. FLETCHER, JR.            WILLIAM E. SCHUYLER, JR.
Attesting Officer                    Commissioner of Patents